United States Patent
Fujishima et al.

(10) Patent No.: US 11,959,768 B2
(45) Date of Patent: Apr. 16, 2024

(54) GUIDANCE CONTROL DEVICE AND GUIDANCE CONTROL METHOD

(71) Applicant: NEC Corporation, Tokyo (JP)

(72) Inventors: Takanori Fujishima, Tokyo (JP); Yuuzou Miyoshi, Tokyo (JP); Tsutomu Maruyama, Tokyo (JP); Takahiro Okamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 797 days.

(21) Appl. No.: 17/041,786

(22) PCT Filed: Mar. 25, 2019

(86) PCT No.: PCT/JP2019/012520
§ 371 (c)(1),
(2) Date: Sep. 25, 2020

(87) PCT Pub. No.: WO2019/188989
PCT Pub. Date: Oct. 3, 2019

(65) Prior Publication Data
US 2021/0025731 A1  Jan. 28, 2021

(30) Foreign Application Priority Data
Mar. 29, 2018  (JP) .................... 2018-065938

(51) Int. Cl.
*G01C 21/00* (2006.01)
*G01C 21/20* (2006.01)

(52) U.S. Cl.
CPC ......... *G01C 21/383* (2020.08); *G01C 21/206* (2013.01)

(58) Field of Classification Search
CPC .... G01C 21/383; G01C 21/206; G06Q 10/08; B65G 1/1373; B65G 1/137; G03B 21/00; H04N 5/74
See application file for complete search history.

(56) References Cited

U.S. PATENT DOCUMENTS 6,924,741 B2 * 8/2005 Tamayama ....... G08B 13/19697
340/925
8,423,431 B1 * 4/2013 Rouaix ................ G06Q 10/087
705/28

(Continued)

FOREIGN PATENT DOCUMENTS

JP  2015-124057 A  7/2015
JP  2016-117582 A  6/2016

(Continued)

OTHER PUBLICATIONS

International Search Report for PCT Application No. PCT/JP2019/012520, dated Jun. 11, 2019.

(Continued)

*Primary Examiner* — Christopher M Brandt
(74) *Attorney, Agent, or Firm* — Sughrue Mion, PLLC

(57) ABSTRACT

A guidance control device is configured to control a projection device for projecting images. The guidance control device is configured to generate a subject-identifying image to be projected on a first projection range relating to a first position at which a subject person conducts a predetermined operation and to generate a guide image guiding the predetermined operation for the subject person to be projected on a second projection range relating to a second position viewable by the subject person. Accordingly, the guidance control device is able to control the projection device including the subject-identifying image and the guide image.

11 Claims, 10 Drawing Sheets

(56) References Cited

U.S. PATENT DOCUMENTS

| | | | |
|---|---|---|---|
| 9,412,053 B1 * | 8/2016 | Patrick | H05B 47/10 |
| 10,040,628 B1 * | 8/2018 | Misra | B65G 1/02 |
| 2017/0094234 A1 * | 3/2017 | Takahama | H04N 9/3141 |
| 2018/0089749 A1 * | 3/2018 | Biermann | H04W 4/029 |
| 2019/0107411 A1 * | 4/2019 | Gil | G06V 20/20 |
| 2019/0196475 A1 * | 6/2019 | Vandewall | B65F 1/1473 |
| 2019/0344966 A1 | 11/2019 | Ishii et al. | |

FOREIGN PATENT DOCUMENTS

| | | |
|---|---|---|
| JP | 2017-062319 A | 3/2017 |
| JP | 6144786 B1 | 6/2017 |
| JP | 2017-197369 A | 11/2017 |
| WO | 2016/207948 A1 | 12/2016 |

OTHER PUBLICATIONS

JP Office Action for JP Application No. 2022-112635, dated Sep. 5, 2023 with English Translation.
JP Office Action for JP Application No. 2022-112635, mailed on Jan. 30, 2024 with English Translation.

* cited by examiner

FIG. 7

<SORTING MANAGEMENT TABLE>

| OPERATOR ID; PRODUCT ID; TRANSPORT QUANTITY; SUBJECT-IDENTIFYING IMAGE ID; |

<PRODUCT DELIVERY TABLE>

| STORE ID; PRODUCT ID; DELIVERY QUANTITY; RESIDUAL SORTING QUANTITY; SORTING-COMPLETION PRESENCE/ABSENCE FLAG; |

<PROJECTION MANAGEMENT TABLE>

| STORE ID; FIRST PROJECTION-RANGE COORDINATES; PROJECTOR ID; |

<PROJECTION CONTROL TABLE>

| OPERATOR ID; PRODUCT ID; SUBJECT-IDENTIFYING IMAGE ID; STORE ID; |

FIG. 8

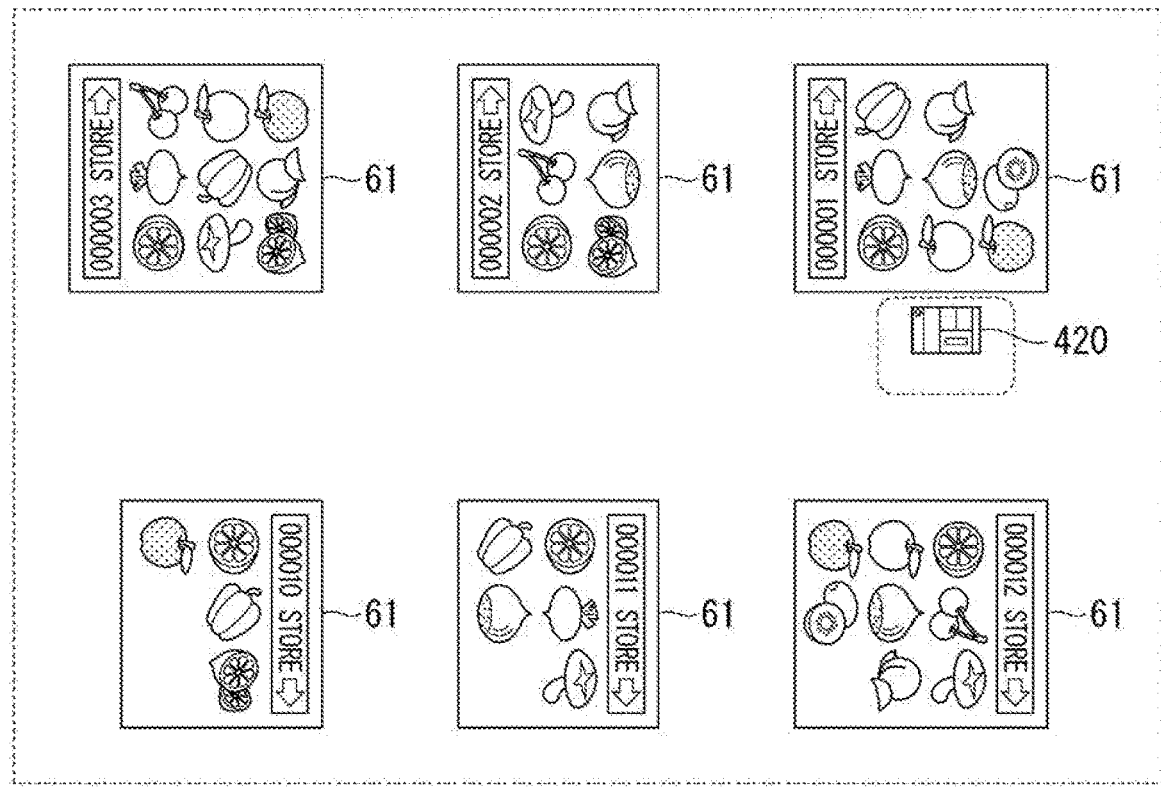

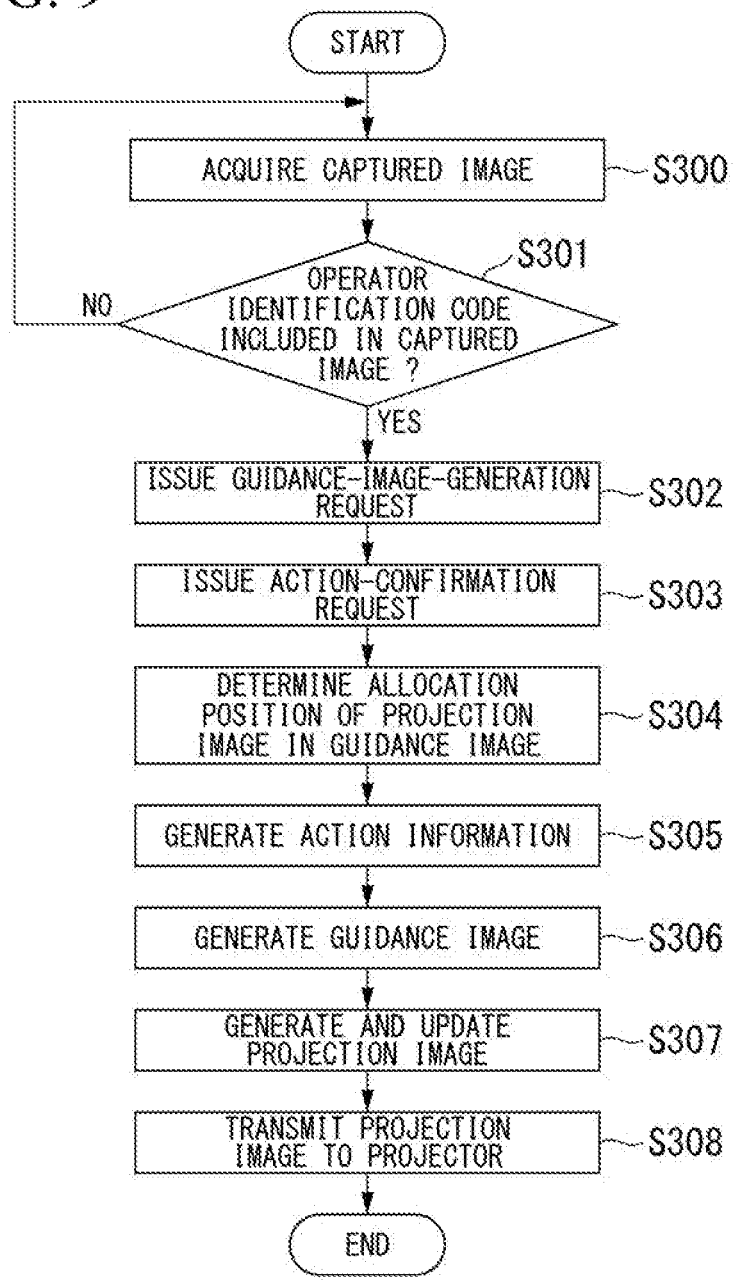

GUIDANCE CONTROL DEVICE AND GUIDANCE CONTROL METHOD

This application is a National Stage Entry of PCT/JP2019/012520 filed on Mar. 25, 2019, which claims priority from Japanese Patent Application 2018-065938 filed on Mar. 29, 2018, the contents of all of which are incorporated herein by reference, in their entirety.

TECHNICAL FIELD

The present invention relates to a guidance control device and a guidance control method.

BACKGROUND ART

Technologies for displaying guidance information on screen for the benefit of operators to carry out predetermined operations at operation sites such as product delivery centers have been known. To individually sort products for each delivery destination, for example, a delivery center may use a technology for displaying guidance information on a predetermined monitor such as a digital display device in order to guide an operator what and how many products and which delivery destination to deliver products. Patent Document 1 discloses product-sorting equipment capable of displaying information (e.g. operation instruction information) relating to product-sorting operations without using any displays. Specifically, a head-mount display (HMD) can be used to display operation instruction information via augmented reality (AR) in picking equipment designed to collect products ordered by users in collecting containers assigned user's orders when delivering products.

CITATION LIST

Patent Literature Document

Patent Document 1: Japanese Patent Application Publication No. 2015-124057

SUMMARY OF INVENTION

Technical Problem

As described above, technologies for displaying guidance information for the benefit of users should present guidance information that may allow operators to accurately carry out operations without error and without the need of using any display devices. At operation sites such as product delivery centers, a number of operators may concurrently carry out their operations at proximate positions in a complicated positional relationship between operating objects (products) and operating locations (sorting containers), which may cause errors in operations. In addition, a head-mount display to be worn by an operator may cause a burden of load to be borne by an operator.

The present invention is presented to solve the aforementioned problem, and therefore the present invention aims to provide a guidance control device and a guidance control method for presenting guidance information for the benefit of users.

Solution to Problem

A first aspect of the present invention is directed to a guidance control device configured to communicate with a projection device. The guidance control device includes a projection control part configured to generate a subject-identifying image to be projected on a first projection range relating to a first position at which a subject person conducts a predetermined operation, to generate a guide image guiding the predetermined operation for the subject person to be projected on a second projection range relating to a second position viewable by the subject person, and to control the projection device to project a projection image including the subject-identifying image and the guide image.

A second aspect of the present invention is directed to a guidance control system including a projection device, and a guidance control device configured to communicate with the projection device. The guidance control device is configured to generate a subject-identifying image to be projected on a first projection range relating to a first position at which a subject person conducts a predetermined operation, to generate a guide image guiding the predetermined operation for the subject person to be projected on a second projection range relating to a second position viewable by the subject person, and to control the projection device to project a projection image including the subject-identifying image and the guide image.

A third aspect of the present invention is directed to a guidance control method. The guidance control method implement the steps of: generating a subject-identifying image to be projected on a first projection range relating to a first position at which a subject person conducts a predetermined operation; generating a guide image guiding the predetermined operation for the subject person to be projected on a second projection range relating to a second position viewable by the subject person; and projecting a projection image including the subject-identifying image and the guide image.

A fourth aspect of the present invention is directed to a storage medium having stored a program causing a computer to implement the steps of: generating a subject-identifying image to be projected on a first projection range relating to a first position at which a subject person conducts a predetermined operation; generating a guide image guiding the predetermined operation for the subject person to be projected on a second projection range relating to a second position viewable by the subject person; and projecting a projection image including the subject-identifying image and the guide image.

Advantageous Effects of Invention

According to the present invention, it is possible to identify a predetermined action to be taken by a subject person and to guide a predetermined action for a subject person without using any display devices. In addition, it is possible for a subject person to accurately carry out a predetermined action without error.

BRIEF DESCRIPTION OF DRAWINGS

FIG. 7 shows examples of various types of data tables used for the image projection process.

FIG. 8 shows examples of projection images generated by the guidance control device according to one embodiment of the present invention.

FIG. 9 is a flowchart showing a process for generating projection images including guide images for the benefit of an operator.

DESCRIPTION OF EMBODIMENTS

A guidance control device and a guidance control method according to the present invention will be described with reference to the accompanying drawings.

Figure 1:
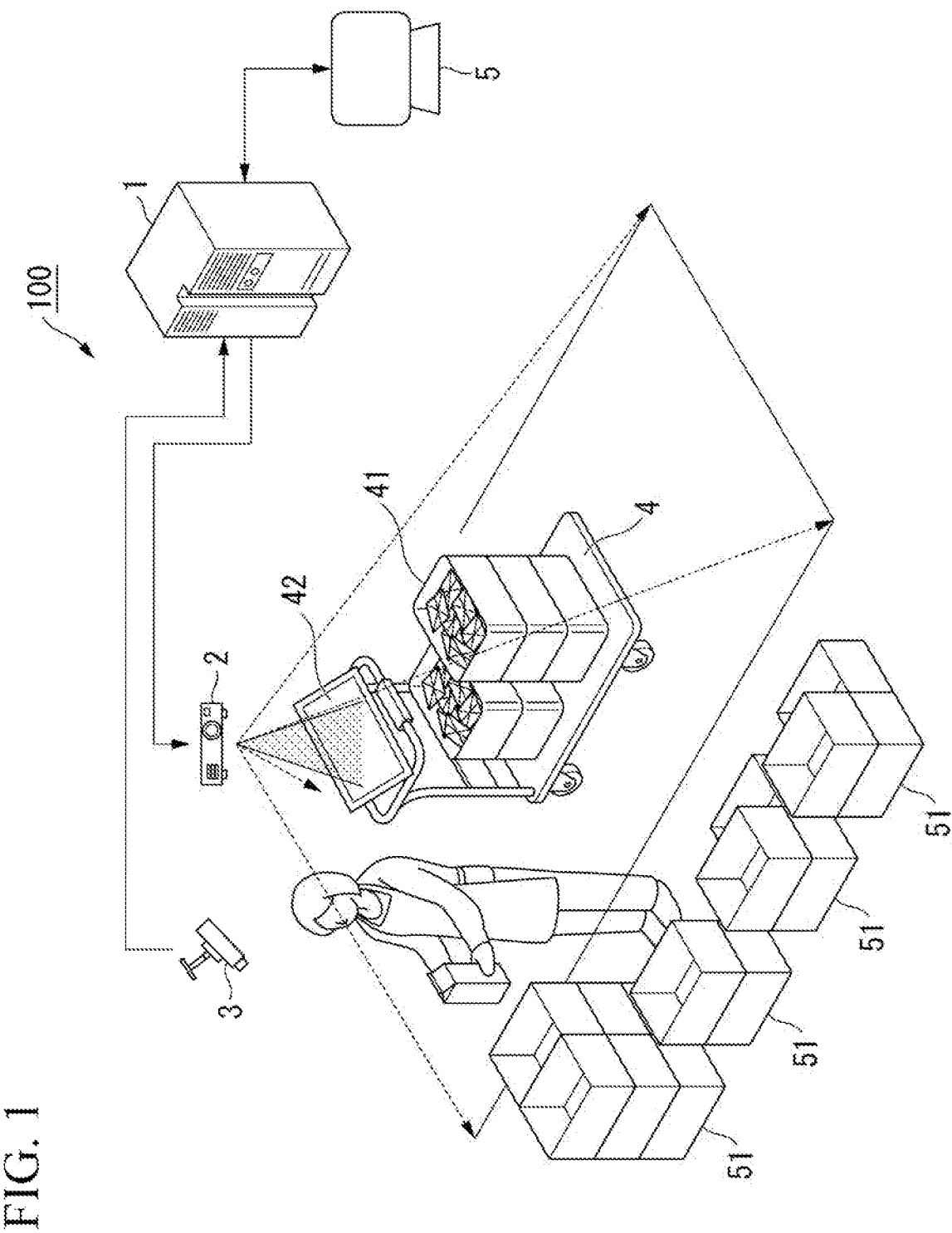
FIG. 1 is a perspective view showing an overall configuration of a guidance control system according to one embodiment of the present invention.

FIG. 1 is a perspective view showing the overall configuration of an operation guidance system 100 adopting an operation guidance device 1 according to one embodiment of the present invention. The operation guidance system 100 includes an operation guidance device 1, a projector (a projection device) 2, a camera (an imaging device) 3, and a terminal (a management device) 5. The guidance control device 1 is connected to the projector 2, the camera 3, and the terminal 5. The projector 2 is located above an operator and configured to project images in a lower direction therefrom. That is, the projector 2 may project images, which are output from the guidance control device 1, in a predetermined projection range. The camera 3 is located above an operator and configured to capture images, which are reflected in the predetermined projection range thereunder, and to transmit captured images to the guidance control device 1. The terminal device 5 may be used by an operator. Assuming products as operation targets, the guidance control system 100 may be located in a delivery center for delivering products to stores serving as product-delivery destinations.

For the sake of convenience, FIG. 1 shows a single projector 2 and a single camera 3 which are connected to the guidance control device 1. Actually, however, a plurality of projectors 2 and a plurality of cameras 3 are connected to the guidance control device 1. In this case, a plurality of projectors 2 may project images on different projection ranges. In addition, a plurality of cameras 3 may capture images reflected in different projection ranges. In this connection, a projection device may not be limited to a projector since a projection device needs to project a predetermined image at a predetermined position. In addition, an imaging device may not be limited to a camera since an imaging device needs to capture an image reflected in a predetermined imaging scope with high resolution. Moreover, a management device may not be limited to a terminal since a management device needs to make predetermined instructions and to input information. The present embodiment refers to a predetermined action taken by an operator (or a subject person) as a sorting operation to sort products destined to stores, but it is possible to handle other products (e.g. parts needed to assemble industrial products) than products sold in stores.

In a delivery center, an operator may be assigned an operation to sequentially put products, which are stored in a product basket 1 mounted on a cart 4, into a delivery basket 51 destined to a predetermined delivery destination. At this time, the guidance control device 1 may control the projector 2 to project a subject-identifying image, which is used to identify an operator who needs to put products into the delivery basket 511, on a first projection range on a floor surface of a pathway in front of the delivery basket 51 serving as a desired delivery destination. When an operator pushing the cart 4 stopped in front of the delivery basket 51 serving as a desired delivery destination is identical to an operator who needs to put products into the delivery basket 51, the guidance control device 1 may control a guide image 420 to be projected to a guide plate 42 (or a second projection range) attached to the cart 4. In this connection, the guide plate 42 is a plate-like structure used to project the guide image 420 for an operator who may conduct a sorting operation. For example, the present embodiment is designed to attach the guide plate 42 to the upper section of the cart 4.

Figure 2:
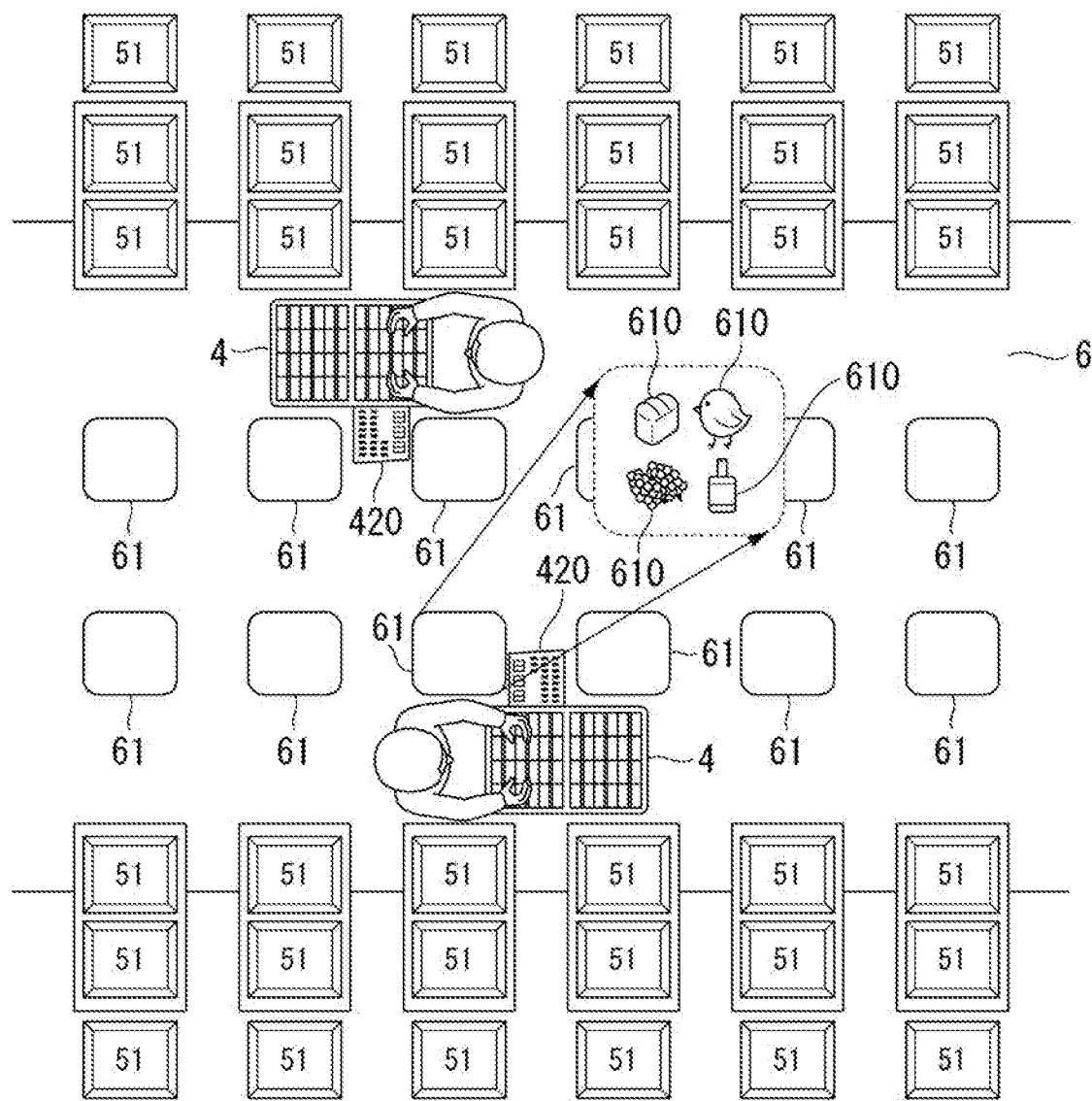
FIG. 2 is a plan view showing an operation status at an operation site adopting the guidance control system according to one embodiment of the present invention.

FIG. 2 is a plan view showing an operation status at a delivery center. FIG. 2 is a plan view viewing the operation status of multiple operators from the above. In FIG. 2, a plurality of delivery brackets 51 destined to different delivery destinations are arranged for each delivery-destination area on the opposite sides of a pathway 6. First projection ranges 61 are each located on the floor surface of the pathway 6 proximate to the delivery baskets 51. A subject-identifying image 610 used to identify a subject operator is projected on the first projection range 61. For example, each operator may be assigned any one of images (i.e. the subject-identifying images 610) representing a plurality of products or articles (e.g. chicks, grapes, etc.). The guidance control device 1 may identify an operator assigned an operation to sort products delivered to a desired delivery destination among operators assigned the subject-identifying images 610. Upon identifying the subject-identifying image 610 assigned to its operator, the guidance control device 1 controls the projector 2 to project the subject-identifying image 610 on the first projection range 61 in front of the delivery basket 51 for its delivery destination. The guidance control device 1 may control the projector 2 to project the guide image 420 on the guide plate 42 attached to the cart 4.

The guidance control device 1 may generate projection images including the guide images 420 and the subject-identifying images 610 with respect to a plurality of delivery destinations, and then the guidance control device 1 may control the projector 2, which is located in a delivery-destination area relating to the delivery baskets 51 associated with those images, to project those projection images.

Figure 3:
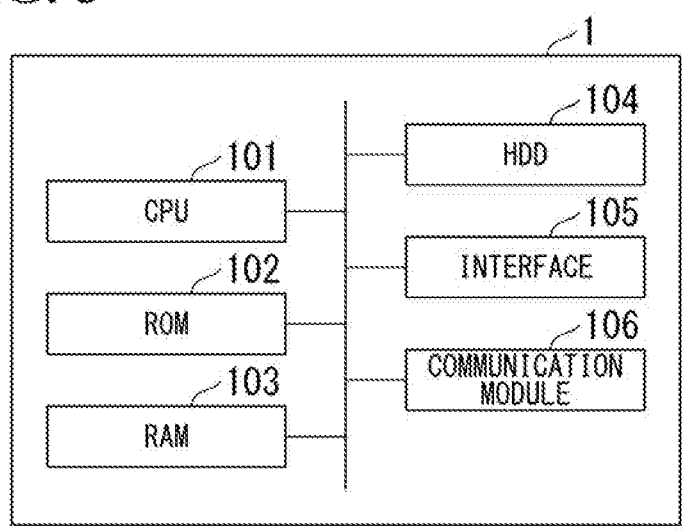
FIG. 3 is a hardware configuration diagram of a guidance control device according to one embodiment of the present invention.

FIG. 3 is a hardware configuration diagram of the guidance control device 1. The guidance control device 1 includes a CPU (Central Processing Unit) 101, a ROM (Read-Only Memory) 102, a RAM (Random-Access Memory) 103, an HDD (Hard-Disk Drive) 104, an interface 105, and a communication module 106. In this connection, the HDD 103 may be configured of an SDD (Solid-State Drive).

Figure 4:
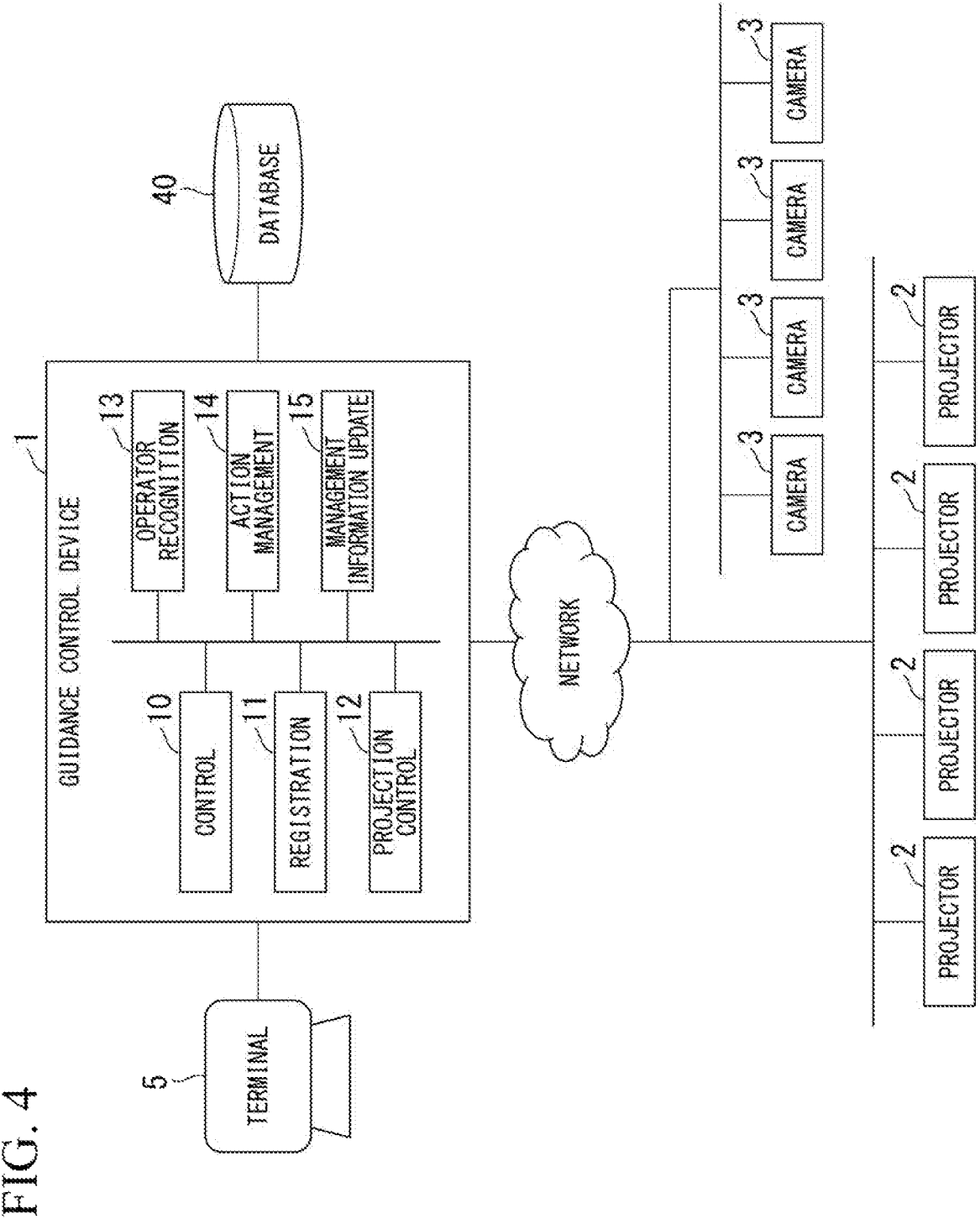
FIG. 4 is a functional block diagram of the guidance control device according to one embodiment of the present invention.

FIG. 4 is a functional block diagram of the guidance control device 1. The guidance control device implements functional parts 10-15 when the CPU 101 executes guidance-control programs stored on the ROM 102 in advance. That is, the guidance control device 1 includes a control part 10, a registration part 11, a projection control part 12, an operator recognition part 13, an action management part 14, and a management information update part 15. The control part 10 is configured to control the registration part 11, the projection control part 12, the operator recognition part 13, the action management part 14, and the management information update part 15.

The registration part 11 is configured to register a correlation between a subject person (or an operator) and the information representing a predetermined action (e.g. a sorting operation) conducted by the subject person. For example, the information representing a predetermined action may indicate a type of products subjected to a sorting operation and the quantity of products put into the product basket 41 of the cart 4. The projection control part 12 is configured to generate a projection image including the subject-identifying image 610 and the guide image 420 and to output the projection image to the projector 2. Accordingly, the projector 2 is able to project the projection image on a predetermined area proximate to the delivery baskets 51. The operator recognition part 13 is configured to recognize an operator based on an image captured by the camera 3. The action management part 14 is configured to recognize a sorting operation conducted by an operator based on the captured image of the camera 3. The management information update part 15 is configured to update a sorting management table used to store management information relating to operations according to the presence/absence of operation completion. In this connection, the guidance control device 1 is connected to a database 40 used to store the sorting management table.

Figure 5:
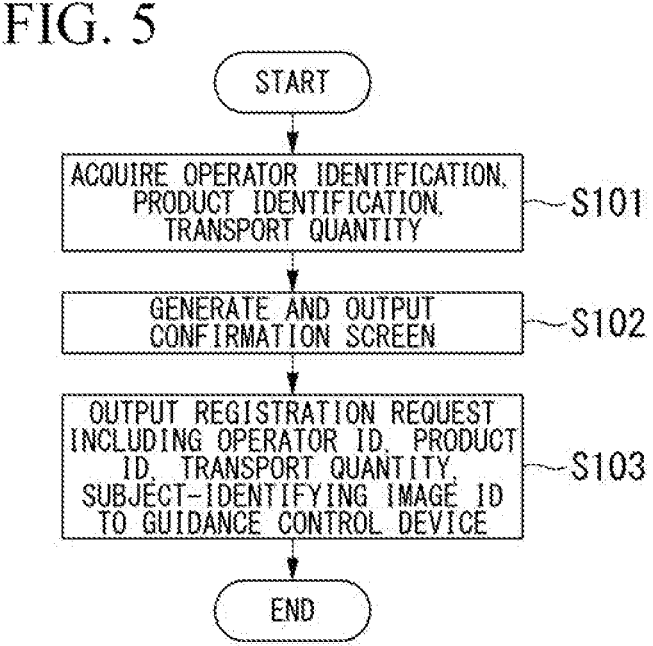
FIG. 5 is a flowchart showing a procedure of a terminal applied to the guidance control device according to one embodiment of the present invention.

Next, a procedure of the terminal 5 used by an operator when starting operations will be described below. FIG. 5 is a flowchart showing the procedure of the terminal 5 (steps S101 through S103). For example, an operator may carry out a sorting operation such that one product or multiple products are put in the product basket 41 used to collect one type of products on the cart 4 and then those products are sequentially put into the delivery baskets 51 located on the floor of a delivery center. At first, an operator needs to register products, which should be sorted by oneself, using the terminal 5. Specifically, the terminal 5 is equipped with a monitor to display a registration screen. Herein, a name-selecting button, a product-selecting button, and a transport-quantity selecting button indicating the quantity of products which can be transported with the cart 4 at a time, are displayed on the registration screen. For example, the monitor of the terminal 5 is configured of a display having a touch panel. An operator may select operator identification information such as a name and an identification (ID) of an operator, selects products, an select a transport operation to transport products with the cart 4 at a time. After selecting a name and an ID of an operator, for example, an operator may select "egg" and its transport quantity of eggs to be transported with the cart 4 at a time. The terminal 5 acquires operator's selected information (e.g. the operator identification information, the product identification information, the transport quantity, etc.) (S101). Based on the operator's selected information, the terminal 5 generates a confirmation screen showing a product name "egg", a transport quantity "100", a subject-identifying image 610 (e.g. an image of "chick") stored in association with the operator identification information, a confirmation button and the like, and then the terminal 5 displays the confirmation screen on the monitor (S102). The subject-identifying image 610 representing "chick" may recall an operator to an image associated with an operation object (e.g. a product "egg"). By visually recognizing the subject-identifying image 610, an operator may recognize that an image displayed on the monitor of the terminal 5 indicates an operation to be conducted by an operator oneself. Upon confirming the displayed information on the confirmation screen, an operator may operate the confirmation button after recognizing the subject-identifying image 610 when the product name and the transport quantity of products subjected to a sorting operation to be conducted by an operator oneself match the pre-registered information registered in advance. Upon detecting the operation of the confirmation button, the terminal 5 outputs to the guidance control device 1 a registration request including an operator ID corresponding to an operator's name, a product ID of a product "egg", a transport quantity of eggs, and a subject-image ID representing the subject-identifying image 610 corresponding to the operator ID (S103). An operator may put one-hundred eggs into the product basket 41, which is then mounted on the cart 4. An operator may push the cart 4 and move along the pathway aligning the delivery baskets 51 on its opposite sides, and then an operator may carry out a sorting operation of products "egg".

Figure 6:
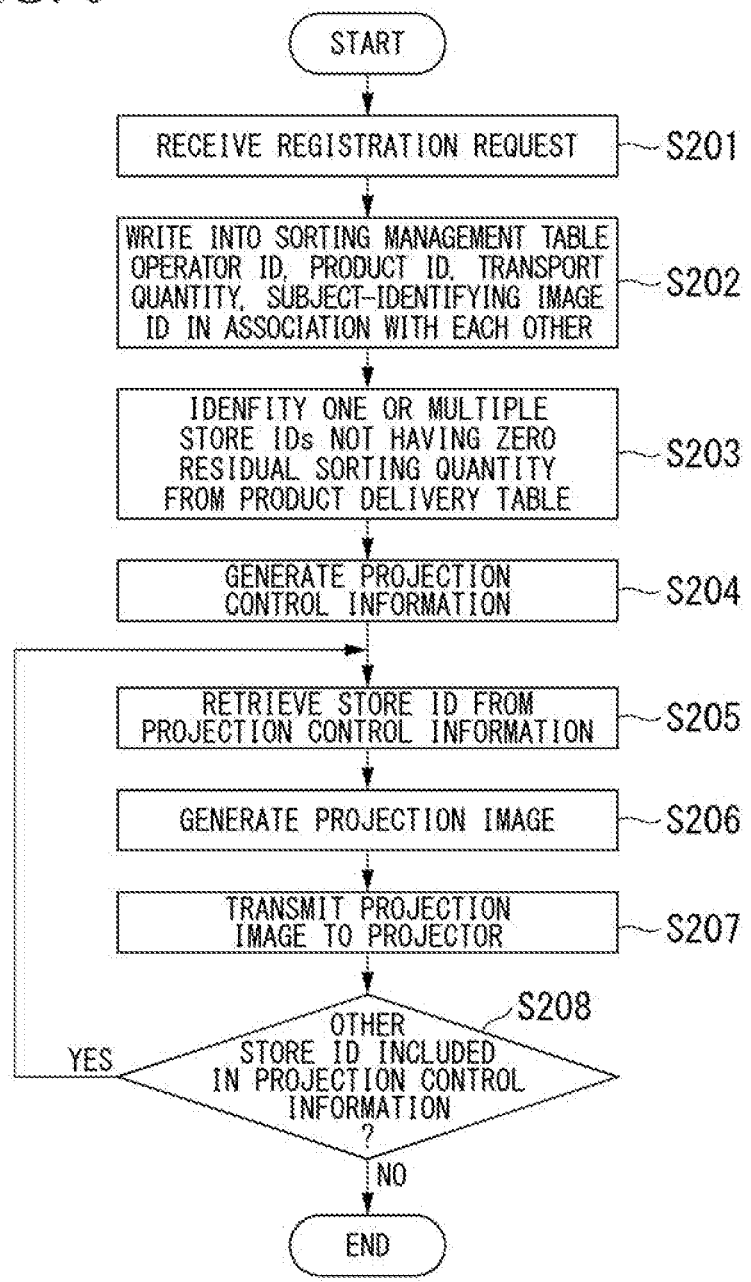
FIG. 6 is a flowchart of an image projection process executed by the guidance control device according to one embodiment of the present invention.

Next, a process (i.e. an image projection process) of the guidance control device 1 to project images by controlling the projector 2 will be described below. FIG. 6 shows a flowchart of the image projection process (S201 through S208). FIG. 7 shows examples of various types of data tables used for the image projection process.

First, the registration part 11 of the guidance control device 1 receives a registration request from the terminal 5 (S201). The registration part 11 writes into a sorting management table stored on the database 40 an operator ID, a product ID of products subjected to a sorting operation, a transport quantity, and a subject-image ID in association with each other (S202). Thus, it is possible to record the information relating to the products subjected to a sorting operation by an operator oneself on the database 40.

In FIG. 7, a product delivery table stores the identification information of a store serving as a delivery destination (i.e. a store ID), the identification information of products to be preferably delivered to a store (i.e. a product ID), a delivery quantity of products to be preferably delivered to a store, a residual quantity of products until completion of a sorting operation (i.e. a residual sorting quantity), and a flag indicating the presence/absence of a completion of a sorting operation in association with each other. In addition, a projection management table stores the identification information of a store serving as a delivery destination (i.e. a store ID), coordinates of a first projection range 61 showing a position to project a projection image for the delivery basket 51 destined to the store, the identification information of the projector 2 configured to project images at the coordinates (i.e. a projector ID). A projection control table stores an operator ID, a product ID, a subject-identifying image ID, and a store ID. The guidance control device 1 generates and stores the aforementioned data tables on a storage unit such as the RAM 103.

The projection control part 12 of the guidance control device 1 is configured to load the recorded information of the sorting management table. In addition, the projection control part 12 may load the stored information of the product delivery table. When issuing a new registration request, the projection control part 12 may retrieve the transport quantity and the product ID of products subjected to a sorting operation which are included in the registration request. The project control part 12 may identify one store ID or plural store IDs not having a residual sorting quantity "0" associated with the product ID on the product delivery table (S203). The store ID indicates a store serving as a delivery destination of products associated with the product ID included in the registration request. In addition, the projection control part 12 may generate the projection control information including one store ID or plural store IDs in addition to the operator ID, the product ID, and the subject-identifying image ID included in the registration request (S204).

FIG. 8 shows examples of projection images to be projected by the projector 2 under the control of the guidance control device 1. As projection images, it is possible to provide a guide image 420 projected on the guide plate 42 of the cart 4 and a storefront image projected on the first projection range 61 positioned in front of the delivery baskets 51 destined to one store or multiple stores. The storefront image includes one or more subject-identifying images 610. The projection control part 12 may generate the projection control information so as to generate projection images as shown in FIG. 8 based on the projection control information. In this connection, the projection control part 12 may generate a projection image precluding the guide image 420 when the projection range of a projection image does not cover the guide plate 42 of the cart 4. As described above, due to storefront images, which will be projected on the first projection range 61 positioned in front of the delivery baskets 51 destined to multiple stores, included in projection images, the present embodiment needs to store projection images associated with the store IDs corresponding to multiple storefront images. The projection control part 12 may store coordinates representative of a range of a storefront image for each store included in a projection image with respect to each store ID.

The projection control part 12 reads one projection control information recorded on the projection control table so as to retrieve the store ID included in the projection control information (S205). The projection control part 12 obtains a projection image associated with the store ID from a storage unit such as the RAM 103. In addition, the projection control part 12 obtains coordinates of a projection range of a storefront image associated with the store ID. The projection control part 12 retrieves the subject-identifying image 610 from the database 40. The projection control part 12 generates a projection image including the subject-identifying image 610 in association with coordinates of the projection range of a storefront image identified by the store ID (S206). The projection control part 12 may store the projection image.

The projection control part 12 identifies the projector 2 used to project a projection image according to a projector ID which is recorded on the projection management table in association with a store ID. The projection control part 12 acquires a network address of the projector 2 serving as a transmission destination of a projection image according to the projector ID. The projection control part 12 transmits a projection image to the projector 2 identified by the network address (S207). Upon receiving the projection image from the projection control part 12, the projector 2 projects the projection image on a predetermined projection range on the pathway in front of the delivery baskets 51.

The projection control part 12 determines whether the projection control information further includes other store IDs (S208). When the projection control information includes the other store ID, the projection control part 12 carries out a projection control to generate or update the projection image in association with the other store ID according to the foregoing process. In addition, the projection control part 12 may determine whether the next projection control information has been generated. When the next projection control information has been generated, the projection control part 12 repeats a projection control to generate or update the projection image according to the next projection control information. The projection control part 12 may terminate the projection control when exiting the image projection process due to a power-off event of the guidance control device 1.

As described above, the guidance control device 1 generates a storefront image including one or plural subject-identifying images 610, and then the guidance control device 1 projects a plurality of projection images each including a storefront image onto the first projection ranges 61 on the pathway such that those projection images are aligned along the pathway. When a storefront image displays a subject-identifying image 610, an operator identified by the subject-identifying image 610 may recognize the need to carry out a product-sorting operation with the delivery basket 51 destined to a predetermined store. When the operator operates the terminal 5 to register a product "egg" subjected to the sorting operation, for example, the operator moves the cart 4 along the pathway and then stops in proximity to the first projection range 61 which the subject-identifying image 610 of the operator oneself is projected on, and therefore the operator needs to put a predetermined number of eggs into the delivery basket 51 associated with the first projection range 61. Accordingly, the operator is able to determine which store's operation needs to be carried out by simply viewing the subject-identifying image 610 projected on the floor surface, and therefore it is possible to improve efficiency of a sorting operation and to reduce an error in a sorting operation.

When the operator stops the cart 4 in front of the first projection range 61 which the subject-identifying image 610 of the operator oneself is projected on, the guide image 420 including the name of products subjected to a sorting operation and the quantity of products to be put into the store basket 51 is projected on the guide plate 42.

Next, a process for generating a projection image including the guide image 420 for the benefit of an operator will be described below. FIG. 9 is a flowchart showing a process of the guidance control device 1 for generating a projection image including a guide image (steps S300 through S308). The aforementioned projection control information will be generated immediately after completion of registration of products subjected to a sorting operation by an operator. On the other hand, the guide image 420 is generated by the guidance control device 1 upon detecting an operator after completion of registration of products when an operator moves the cart 4 to carry out a sorting operation and then enters into the image-capturing scope of the camera 3 since the cart 4 is positioned in front of the store basket 51 destined to a store serving as a delivery destination of products.

The operator pushes the cart 4 to enter into the pathway and then moves along the pathway while checking whether the subject-identifying image 610 of the operator oneself is projected on the first projection range 61 in front of the store basket 51. When the subject-identifying image 610 of the operator oneself is projected on the first projection range 61 on the floor surface of the pathway, the operator may stop the cart 4 at a cart-rest position corresponding to the first projection range 61 or its proximate position. The camera 3 is configured to capture an image reflected in a predetermined image-capturing scope in a predetermined interval of time (e.g. one second) and to transmit the captured image to the guidance control device 1. In this connection, the camera 3 may transmit a moving image instead of a still image to the guidance control device 1. The guidance control device 1 receives the captured image or a moving image from the camera 3.

The operator recognition part 13 of the guidance control device 1 acquires the captured image (or the moving image) received from the camera 3 (S300). For example, the image-capturing scope of the camera 3 covers a plurality of store baskets 51 or part of the pathway in front of the store baskets 51. In this connection, the image-capturing scope of the camera 3 may overlap with the projection range of the projector 2, alternatively, the image-capturing scope may not necessarily overlap with the projection range. The guidance control device 1 is configured to store on the database 40 a correlation between coordinates of an image reflected in the image-capturing scope of the camera 3 and coordinates of a projection image projected onto the projection range of the projector 2 in association with the store ID. When updating the projection image, the guidance control device 1 is able to recognize which store's store ID is associated with the projection image to be updated.

The operation recognition part 13 detects whether the captured image of the camera 3 includes an operator identification code (S301). For example, an operator identification code is printed on the guide plate 42 or the cart 4 which can be imaged by the camera 3. Alternatively, an operator identification code may be printed at a position whose image can be captured from the camera 3 such as work clothes worn by an operator. The operator identification code may be configured of a two-dimensional code or a combination of alphanumeric characters. When an imaging device detects an operator identification code, the operator recognition part 13 retrieves an operator ID, which was stored in advance in association with the operator identification code, from the database 40. The operator recognition part 13 obtains coordinates of the operator identification code in the captured image. The operator recognition part 13 retrieves a store ID, which is associated with coordinates of the operator identification code in the captured image, from the database 40. For example, the operator recognition part 13 transmits to the projection control part 12 a guide-image generation request including an operator ID, a store ID associated to coordinates of the operator identification code in the captured image, and a camera ID representing the camera 3 serving as a transmission source used for obtaining those identifications (S302). In addition, the operator recognition part 13 transmits to the action management part 14 an action confirmation request including an operator ID, a product ID stored on the sorting management table in association with the operator ID, a store ID obtained in the aforementioned process, and a camera ID (S303).

The projection control part 12 acquires the captured image of the camera 3 identified by the camera ID included in the guide-image generation request. The projection control part 12 detects coordinates of the guide plate 42 reflected in the captured image of the camera 3. The projection control part 12 obtains the store ID from the guide-image generation request. In addition, the projection control part 12 identifies the projector 2 associated with coordinates of the guide plate 42 reflected in the captured image of the camera 3. The projection control part 12 converts coordinates of the guide plate 42 included in the captured image into coordinates of the guide plate 42 included in a projection image, thus determining the position of the guide image 420 to be disposed in a projection image (S304).

The projection control part 12 obtains the operator ID and the store ID from the guide-image generation request. The projection control part 12 retrieves the product ID which is recorded on the sorting management table in association with the operator ID. The product ID contains the information of products to be put into the store basket 51 by an operator.

The projection control part 12 acquires a residual sorting quantity of products which is recorded on the product delivery table in association with the product ID and the store ID obtained from the guide-image generation request. The residual sorting quantity indicates a quantity of products which need to be sorted with respect to a store identified by the store ID.

The projection control part 12 acquires a transport quantity recorded on the sorting management table in association with the operator ID and the product ID. The transport quantity indicates a quantity of products identified by the product ID which an operator identified by the operator ID is currently carrying with the cart 4.

The projection control part 12 determines the residual sorting quantity as an operator's sorting quantity when the residual sorting quantity indicates one or more value while the transport quantity indicates a value equal to or above the residual sorting quantity. The projection control part 12 determines the transport quantity as an operator's sorting quantity when the residual sorting quantity indicates one or more value while the transport quantity indicates a value less than the residual sorting quantity. When the sorting quantity is equal to one or more, the projection control part 12 generates the action information describing the operator ID, the store ID, the product ID, and the sorting quantity (S305). The projection control part 12 stores the action information on a storage unit such as the RAM 103. The action information indicates which sorting operation needs to be carried out by an operator. The projection control part 12 exits a sorting operation upon determining a zero sorting-quantity when the residual sorting quantity is "0".

The projection control part 12 generates the guide image 420 showing the name of products indicated by the product ID, a product image associated with the product ID, and an operator's sorting quantity (S306). Subsequently, the projection control part 12 generates or updates a projection image locating the guide image 420 at a predetermined position (S307). The projection control part 12 acquires a network address of the projector 2 associated with coordinates of the guide plate 42 and then transmits a projection image toward the network address (S308). Upon receiving the projection image from the projection control part 12, the projector 2 projects the projection image on the first projection range 61 or the guide plate 42. In this connection, the guidance control device 1 is configured to execute a series of steps S300 through S308 in parallel with respect to images captured by multiple cameras 3.

According to the above process, the guide image 420 is projected on the guide plate 42 attached to the cart 4. The guidance control device 1 is configured to determine the position of the guide image 420 to be located in a projection image according to coordinates of the guide plate 42. For this reason, the guidance control device 1 is able to generate a projection image subjected to positioning such that the guide image 420 can be projected at the position of the guide plate 42 upon determining coordinates of the projector 2 in its projection range in correspondence with coordinates of the guide plate 42 in the captured image when the image-capturing scope of the camera 3 covers the position of the guide plate 42.

An operator should confirm whether any discrepancy can be found with respect to the type and the quantity of products carried by the operator oneself by viewing a product name, a product image, and a sorting quantity included in the guide image 420 projected on the guide plat 42, and therefore the operator may takes the sorting quantity of products out of the product basket 41 so as to put them into the store basket 51. Accordingly, the operator may finish a sorting operation of products destined to a predetermined store. Thereafter, the operator moves the cart 4 toward the position at which the subject-identifying image 610 identifying the operator oneself is reflected on the floor surface of the pathway, and then the operator will repeatedly carry out a sorting operation until products run out in the product basket 41.

Displaying the guide image 420 on the guide plate 42 may allow the operator to accurately recognize the details of an operation. In addition, the operator may swiftly and accurately carry out an operation according to the guide image 420. In this connection, it is unnecessary to project the guide image 420 on the guide plate 42, and therefore it is possible to project the guide image 420 on another floor-surface area or the delivery basket 51.

The guidance control device 1 needs to determine whether an operator has carried out a sorting operation and to update the information with the sorting management table and the product delivery table when the operator has carried out the sorting operation. In addition, the operator recognition part 13 may determine whether the position of an operator relative to the subject-identifying image 610 projected on the first projection range 61 on the floor surface of the pathway matches the position of a store (i.e. the position of the store basket 51) which is requested to deliver products transported by the operator. In this case, the operator recognition part 13 acquires a product ID recorded on the sorting management table in association with an operator ID relating to an operator identification code in the captured image of the camera 3. In addition, the operator recognition part 13 acquires a product ID recorded on the product delivery table in association with a store ID of a store associated with coordinates of the operator identification code in the captured image of the camera 3. When two product IDs match each other, it is possible to determine that the position of the operator matches the position of carrying out a sorting operation with a store which is requested to deliver products transported by the operator. Upon determining that the position of the operator identified by the subject-identifying image 610 projected on the first projection range 61 matches the position of carrying out a sorting operation, the projection control part 12 may control the projector 2 to project the guide image 420 urging the operator to carry out a sorting operation on the guide plate 42 (or a second projection range).

Figure 10:
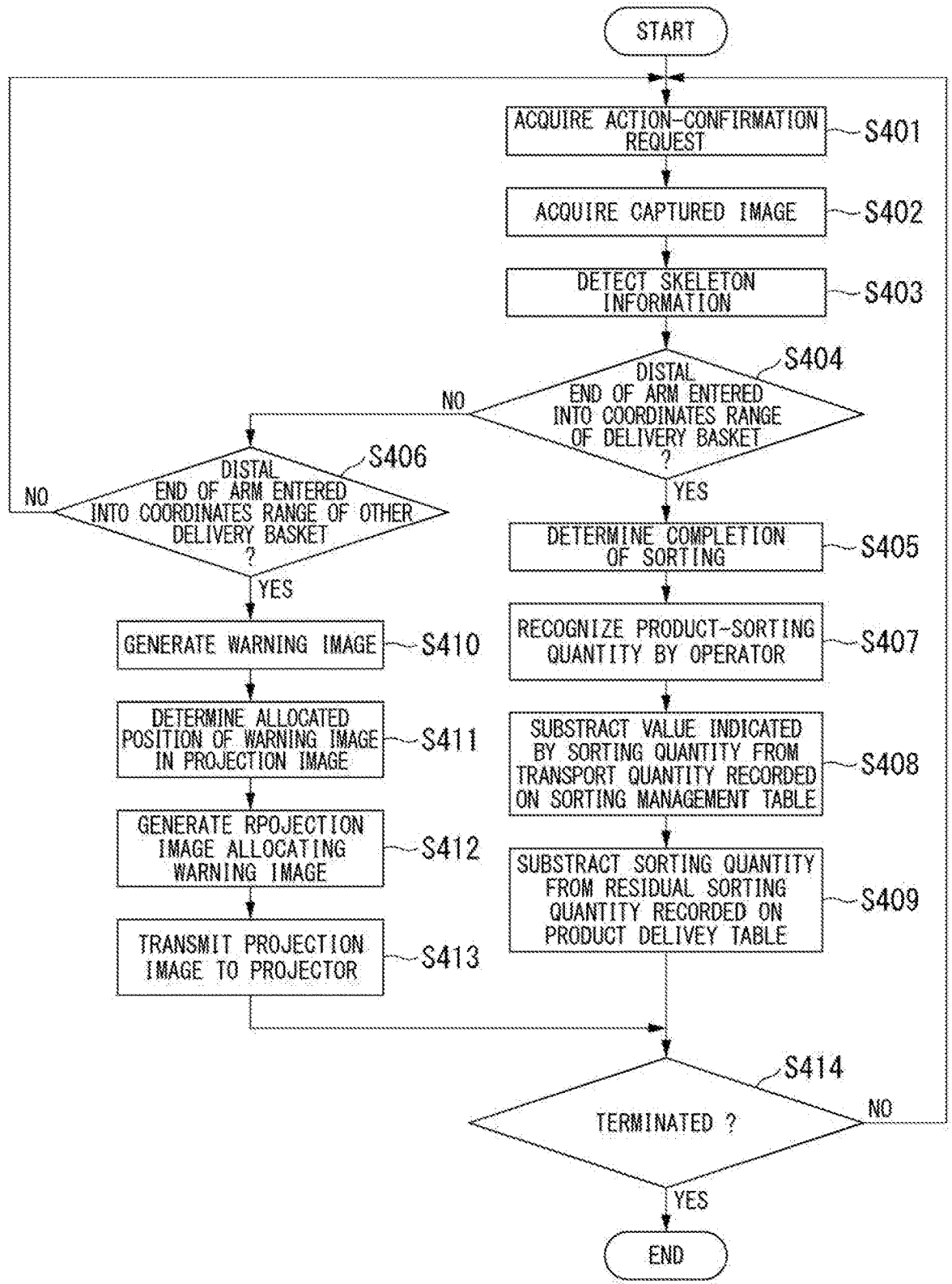
FIG. 10 is a flowchart showing a sorting-operation determination process with the guidance control device according to one embodiment of the present invention.

Next, a process for determining whether an operator carries out a sorting process with the guidance control device 1 (i.e. a sorting-operation determination process) will be described below. FIG. 10 is a flowchart of the sorting-operation determination process (steps S401 through S414).

The action management part 14 of the guidance control device 1 acquires an action confirmation request sent from the operator recognition part 13 (S401). Similar to the operator recognition part 13, the action management part 14 acquires the captured image of the camera identified by a camera ID included in the action confirmation request (S402). The action management part 14 detects skeleton information of an operator whose image is reflected in the captured image of the camera (S403). As described above, the camera 3 captures an image of an operator from the above. Since the captured image covers a head and arms of an operator, it is possible to detect a head of an operator and an extending direction of an operator's arm when the operator extends its arm via image analysis. Based on the skeleton information, the action management part 14 calculates vectors representing a length of an operator's arm and an extending direction of the operator's arm reflected in the captured image. In this connection, it is possible to calculate vectors relating the size and the moving direction of an object using a known technology. The action management part 14 retrieves from the database 40 coordinates of the delivery basket 51 destined to a store identified by a store ID recorded in the action confirmation information. The action management part 14 determines whether or not a distal end of an operator's arm enters into a range of coordinates of the deliver basket 51 based on coordinates of the delivery basket 51 and a vector representing an extending direction of an operator's arm (S404). That is, the action management part 14 determines whether a distal end of an operator's arm (or an operator's hand), which depends on the length of an operator's arm and the vector representative of an extending direction of an operator's arm, enters into a range of coordinates of the delivery basket 51 relating to the store ID recorded on the action confirmation request. The action management part 14 determines a completion of a sorting operation upon determining that a distal end of an operator's arm enters into a range of coordinates of the delivery basket 51 relating to the store ID recorded on the action confirmation request (S405). In this connection, the aforementioned determination may exemplify a determination process of the action management part 14 even though the action management part 14 is configured to determine a completion of a sorting operation as to whether part of an operator's body enters into a predetermined range of positions relating to a predetermined action. When a determination result of step S404 is "NO", the action management part 14 determines whether or not a distal end of an operator's arm enters into a range of coordinates of the other delivery basket 51 based on coordinates of the delivery basket 51 and the vector representative of an extending direction (S406). That is, the action management part 14 determines whether or not a distal end of an operator's arm, which depends on the above vector and the length of an operator's arm, enters into a range of coordinates of the delivery basket 51 destined to another store than the delivery basket 51 identified by the store ID included in the action confirmation request. When a determination result of step S406 is "NO", the flow returns to step S401, and therefore the action management part 14 does not determine a completion of a sorting operation.

When a determination result of step S404 is "YES", the action management part 14 determines a completion of a sorting operation (S405), and then the action management part 14 determines whether the action information including an operator ID, a store ID, and a product ID included in the action confirmation request is stored in a storage unit such as the RAM 103. As described in FIG. 9, the action information is generated by the projection control part 12 when generating the guide image 420. When the action information including the operator ID, the store ID, and the product ID has been stored on the storage unit, the action management part 14 obtains a sorting quantity included in the action information. Upon determining a completion of a sorting operation, the action management part 14 confirms a sorting quantity of products by an operator (S407). The action management part 14 reads a transport quantity which is recorded on the sorting management table in association with the operator ID and the product ID and then subtract the sorting quantity from the transport quantity (S408). In addition, the operation management part 14 reads a residual sorting quantity which is recorded on the product delivery table in association with the store ID and the product ID and then subtracts the sorting quantity included in the action information from the residual sorting quantity (S409). Accordingly, it is possible to update the residual sorting quantity of products to be delivered to a store when the operator completes the sorting operation.

When a determination result of step S406 is "YES", the action management part 14 determines that an operator may carry out an erroneous sorting operation since the action management part 14 determined that a distal end of an operator's arm entered into a range of coordinates of the delivery basket 51 destined to another store than the delivery basket 51 identified by the store ID of the action confirmation request. In this case, the action management part 14 generates a warning image (or warning information) (S410). The action management part 14 sends to the projection control part 12 the warning image together with a warning-image projection request including the operator ID and the store ID included in the action confirmation request. When the action management part 14 fails to determine that a distal end of an operator's arm enters into a range of coordinates of the delivery basket 51 identified by the store ID included in the action confirmation request for a predetermined time or more, the action management part 14 may display a warning image notifying an operator of an incompletion of a sorting operation on a display device attached to the wall of a product delivery center.

Based on the store ID and the operator ID included in the warning-image projection request, the projection control part 12 identify from the captured image of the camera 3 a range of coordinates of the guide plate 42 of the cart 4 pushed by an operator identified by the operator ID. As described in FIG. 9, the projection control part 12 identifies a range of coordinates of the guide plate 42 reflected in the captured image of the camera 3. The projection control part 12 converts coordinates of the guide plate 42 covered by the captured image into coordinates of the guide plate 42 covered by a projection image, thus determining the position of the warning image to be located in the projection image (S411). Subsequently, the projection control part 12 generates the projection image superposing the warning image (or the warning information) at the above position (S412). The projection control part 12 acquires the network address of the projector 2 relating to coordinates of the guide plate 42 so as to transmit the projection image toward the network address (S413). Accordingly, the projector 2 is able to project the projection image on a predetermined projection range. Thereafter, the action management part 14 determines whether to terminate the above process depending on whether it receives another action confirmation request (S414). Upon receiving another action confirmation request, the flow will be returned to step S401 so as to repeat a series of aforementioned steps.

Even when an operator mistakenly handles another store basket 51 as the store basket 51 into which an operator needs to put products subjected to a sorting process, it is possible to notify an operator of a warning image (or warning information) via a series of foregoing steps S406, S410-S413. Accordingly, it is possible to improve an accuracy of a sorting operation.

The guidance control device 1 may calculate a total delivery quantity for each store based on summation of delivery quantities of products destined to a store identified by the store ID recorded on the product delivery table, and therefore it is possible to calculate the size of the space used for allocating the store baskets 51 along the pathway based on the total delivery quantity. That is, it is possible for an operator to allocate the store baskets 51 on the floor of a product delivery center based on the size of the space for allocating the store baskets 51 for each store according to the total delivery quantity calculated by the guidance control device 1. Accordingly, it is possible to appropriately allocate the store baskets 51 along the pathway according to the total delivery quantity for each store.

Figure 11:
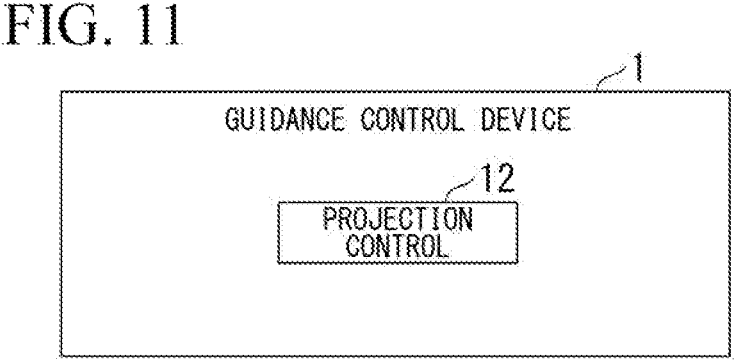
FIG. 11 is a block diagram showing a minimum configuration of the guidance control device according to one embodiment of the present invention.

FIG. 11 is a block diagram showing a minimum configuration of the guidance control device 1. The guidance control device 1 needs to be equipped with at least the projection control part 12. The projection control part 12 controls a projection device (e.g. the projector 2) to project the subject-identifying image 610 indicating a subject person (or an operator) on the first projection range 61 relating to the position of a subject person conducting a predetermined action while projecting the guide image 420 guiding a predetermined action for a subject person on a second projection range relating to the position of a subject person conducting the predetermined action.

The aforementioned descriptions refer to the configuration and functions of the guidance control device 1 under the situation where an operator may carry out a sorting operation of products with the guidance control system 100 installed in a product delivery center. However, the guidance control device 1 is not necessarily used in a product delivery center but can be used in other fields. For example, it is possible to generate a guide image 420 viewable by a customer visiting a store, and therefore it is possible to project a projection image including the guide image 420 on a projection range proximate to the position of the customer who may take some product from a shelf by hand. For example, the guide image 420 may represent an advertisement of predetermined products.

The guidance control device 1 includes a computer system therein, in which the foregoing processes are stored on computer-readable storage media as computer programs. That is, it is possible to execute the foregoing processes when a computer loads and execute computer programs from storage media. Herein, computer-readable storage media refer to magnetic disks, magneto-optical disks, CD-ROM, DVD-ROM, semiconductor memory or the like. In addition, it is possible to deliver computer programs to computers through communication lines, thus causing computers to execute computer programs. The foregoing computer programs may achieve part of the foregoing functions of the guidance control device 1. In addition, the foregoing computer programs may be differential files (or differential programs) which can achieve the foregoing functions when combined with pre-installed programs stored in computer systems in advance.

Lastly, the present invention is not necessarily limited to the foregoing embodiment, and therefore the present invention may embrace various modifications and design changes without departing from the scope of the invention as defined by the appended claims.

Various examples have been described with respect to the present invention, but those examples are illustrative and may not necessarily limit the scope of the invention. Those examples may add, omit, replace, or change some elements without departing from the subject matter of the invention.

Part or entirety of the foregoing embodiment can be explained using the following annotations, but which are not restrictive.

(Annotation 1)

A guidance control device is configured to communicate with a projection device and includes a projection control part configured to generate a subject-identifying image to be projected on a first projection range relating to a first position at which a subject person conducts a predetermined operation, to generate a guide image guiding the predetermined operation for the subject person to be projected on a second projection range relating to a second position viewable by the subject person, and to control the projection device to project a projection image including the subject-identifying image and the guide image.

(Annotation 2)

The guidance control device according to annotation 1 may further include a subject recognition part configured to recognize the subject person relating to the subject-identifying image, wherein the projection control part may control the projection device to project the guide information on the second projection range according to identification information of the subject person.

(Annotation 3)

The guidance control device according to annotation 2 may further include an action management part configured to determine the presence/absence of a completion of the predetermined operation conducted by the subject person, and a management information update part configured to update the management information relating to the predetermined operation according to a determination result of the action management part.

(Annotation 4)

In the guidance control device according to annotation 3, the action management part may determine the presence/absence of the completion of the predetermined operation upon detecting whether part of a body of the subject person enters into a predetermined range relating to the first position for conducting the predetermined operation.

(Annotation 5)

In the guidance control device according to annotation 3, the action management part may generate a warning image when an action of the subject person differs from the predetermined operation while the projection control part may control the projection device to project the projection image including the warning image.

(Annotation 6)

The guidance control device according to annotation 3 may further include a registration part configured to register a correlation between the subject person and the predetermined operation.

(Annotation 7)

In the guidance control device according to annotation 6, the projection control part may identify the predetermined operation relating to the identification information of the subject person recognized by the subject recognition part according to the correlation and to control the projection device to project the guide image for guiding the predetermined operation on the second projection range.

(Annotation 8)

In the guidance control device according to annotation 1, the predetermined operation may be a sorting operation of products, and therefore the projection control part may project on the second projection range the guide image including a delivery destination of products subjected to the sorting operation, a type of products, and a quantity of products.

(Annotation 9)

In the guidance control device according to annotation 2, the subject recognition part may determine whether a current position of the subject person relating to the subject-identifying image projected on the first projection range matches the first position for conducting the predetermined operation, and therefore the projection control part may project the guide image urging the subject person to conduct the predetermined operation on the second projection range when the current position of the subject person matches the first position.

(Annotation 10)

A guidance control system includes a projection device, and a guidance control device configured to communicate with the projection device. The guidance control device is configured to generate a subject-identifying image to be projected on a first projection range relating to a first position at which a subject person conducts a predetermined operation, to generate a guide image guiding the predetermined operation for the subject person to be projected on a second projection range relating to a second position viewable by the subject person, and to control the projection device to project a projection image including the subject-identifying image and the guide image.

(Annotation 11)

A guidance control method implements the steps of: generating a subject-identifying image to be projected on a first projection range relating to a first position at which a subject person conducts a predetermined operation; generating a guide image guiding the predetermined operation for the subject person to be projected on a second projection range relating to a second position viewable by the subject person; and projecting a projection image including the subject-identifying image and the guide image.

(Annotation 12)

A storage medium stores a program causing a computer to implement the steps of: generating a subject-identifying image to be projected on a first projection range relating to a first position at which a subject person conducts a predetermined operation; generating a guide image guiding the predetermined operation for the subject person to be projected on a second projection range relating to a second position viewable by the subject person; and projecting a projection image including the subject-identifying image and the guide image.

The present application claims the benefit of priority on Japanese Patent Application No. 2018-65938 filed on Mar. 29, 2018, the subject matter of which is hereby incorporated herein by reference.

INDUSTRIAL APPLICABILITY

The present invention provides a guidance control device installed in a product delivery center in order to guide an operation content for an operator assigned a sorting operation of products with; but this is not a restriction. For example, it is possible to install a guidance control device for the purpose of providing guidance information to customers when purchasing products or settling payment. In addition, it is possible to install a guidance control device at public facilities such as railroad stations or airports for the purpose of providing guidance information to passengers or users.

REFERENCE SIGNS LIST 1 guidance control device
2 projector (projection device)
3 camera (imaging device)
4 cart
5 terminal (management device)
10 control part
11 registration part
12 projection control part
13 operator recognition part
14 action management part
15 management information update part
40 database
41 product basket
42 guide plate
51 store basket
420 guide image
610 subject-identifying image

What is claimed is:

1. A guidance control device configured to communicate with
   at least one memory configured to store instructions; and
   at least one processor configured to execute the instructions to:
   generate a subject-identifying image to be projected on a first projection range relating to a first position at which a subject person conducts a predetermined operation;
   generate a guide image guiding the predetermined operation for the subject person to be projected on a second projection range relating to a second position viewable by the subject person;
   control the projection device to project a projection image including the subject-identifying image and the guide image;
   recognize the subject person relating to the subject-identifying image;
   control the projection device to project the guide information on the second projection range according to identification information of the subject person;
   determine presence/absence of a completion of the predetermined operation conducted by the subject person;
   generate a warning image when an action of the subject person differs from the predetermined operation; and
   control the projection device to project the projection image including the warning image.

2. The guidance control device according to claim 1, wherein the at least one processor is further configured to execute the instructions to: further update management information relating to the predetermined operation according to a determination result.

3. The guidance control device according to claim 1, wherein the at least one processor is configured to execute instructions to determine the presence/absence of the completion of the predetermined operation upon detecting whether part of a body of the subject person enters into a predetermined range relating to the first position for conducting the predetermined operation.

4. The guidance control device according to claim 1, further wherein the at least one processor is further configured to execute the instructions to register a correlation between the subject person and the predetermined operation.

5. The guidance control device according to claim 4, wherein the at least one processor is configured to execute the instructions to: identify the predetermined operation relating to the identification information of the recognized subject person according to the correlation and control the projection device to project the guide image for guiding the predetermined operation on the second projection range.

6. The guidance control device according to claim 1, wherein the predetermined operation is a sorting operation of products, and wherein the at least one processor is configured to execute the instructions to project on the second projection range the guide image including a delivery destination of the products subjected to the sorting operation, a type of the products, and a quantity of the products.

7. The guidance control device according to claim 1, wherein the at least one processor is configured to execute the instructions to: determine whether a current position of the subject person relating to the subject-identifying image projected on the first projection range matches the first position for conducting the predetermined operation; and
   project the guide image urging the subject person to conduct the predetermined operation on the second projection range when the current position of the subject person matches the first position.

8. The guidance control device according to claim 1, wherein the predetermined operation is a sorting operation of products,
   wherein the products before the sorting operation are put into a cart moved by the subject person, and
   wherein the second projection range includes a surface of a plate attached to the cart.

9. The guidance control device according to claim 8, wherein the at least one processor is configured to execute instructions to:
   detect a location of the subject person by recognizing the subject person relating to the subject-identifying image; and
   control the projection device to project the projection image on the second projection range in a case where the location of the subject person is a location for the sorting operation.

10. A guidance control system comprising:
    a projection device; and
    a guidance control device configured to communicate with the projection device,
    wherein the guidance control device is further configured to:
    generate a subject-identifying image to be projected on a first projection range relating to a first position at which a subject person conducts a predetermined operation;
    generate a guide image guiding the predetermined operation;
    for the subject person to be projected on a second projection range relating to a second position viewable by the subject person;
    control the projection device to project a projection image including the subject-identifying image and the guide image;
    recognize the subject person relating to the subject-identifying image;
    control the projection device to project the guide information on the second projection range according to identification information of the subject person;
    determine presence/absence of a completion of the predetermined operation conducted by the subject person;
    generate a warning image when an action of the subject person differs from the predetermined operation; and
    control the projection device to project the projection image including the warning image.

11. A guidance control method, comprising:
- generating a subject-identifying image to be projected on a first projection range relating to a first position at which a subject person conducts a predetermined operation;
- generating a guide image guiding the predetermined operation for the subject person to be projected on a second projection range relating to a second position viewable by the subject person;
- projecting a projection image including the subject-identifying image and the guide image;
- recognizing the subject person relating to the subject-identifying image;
- controlling the projection device to project the guide information on the second projection range according to identification information of the subject person;
- determining presence/absence of a completion of the predetermined operation conducted by the subject person;
- generating a warning image when an action of the subject person differs from the predetermined operation; and
- controlling the projection device to project the projection image including the warning image.

* * * * *